United States Patent Office 3,304,220
Patented Feb. 14, 1967

3,304,220
PRODUCTION OF NON-WOVEN WEBS FROM SYNTHETIC FIBERS
James Eric McIntyre, Harrogate, England, assignor to Imperial Chemical Industries Limited, London, England, a corporation of Great Britain
No Drawing. Filed May 6, 1963, Ser. No. 278,473
Claims priority, application Great Britain, May 7, 1962, 17,423/62
8 Claims. (Cl. 161—170)

This invention relates to the production of webs from synthetic filaments and fibres, more particularly it relates to webs of non-woven fabrics.

In the known methods for the production of non-woven fabrics from synthetic thermoplastic fibres, adhesives or bonding agents are used to interbond the fibres at their crossing points.

I now provide another method for the production of such non-woven fabrics in which at least some bonding of the synthetic filaments and fibres is achieved without the use of adhesives. In the following description the term "fibres" includes filaments, fibres and yarns.

I have made the observation that polyester fibres, particularly those derived from terephthalic acid, which are in a substantially amorphous or slightly crystalline state, e.g. shortly after melt spinning, become tacky when heated in that condition above the second order transition temperature and can therefore be made to adhere to each other. When the fibres subsequently become crystalline the tackiness disappears, but any adhesion or bonding which has occurred before and during crystallisation remains.

According to my invention I provide a method for producing a non-woven fabric from polyester or copolyester fibres whereby the fibres in a substantially non-crystalline state are brought into contact with each other at a temperature above their second order transition temperature and below their crystalline melting point, and the bonded fibres thus formed are subsequently caused or permitted to crystallise.

Crystallisation of the fibres can be accelerated for example by heating to a temperature above the second order transition temperature. In some cases crystallisation occurs spontaneously, without heating.

It will be appreciated that the fibres must remain in their substantially amorphous or only slightly crystalline state for a time sufficient to allow adhesion between the fibres to occur, before substantial crystallisation sets in and the tackiness of the fibres thereby disappears.

Some orientation may be imparted to the fibres, for example by drawing after bonding.

The fibres may be heated during or after orientation in order to set them in a given shape or to impart desired shrinkage properties.

Before or after bonding the fibres may be heated to shrink them in a completely relaxed condition, or under a controlled tension so as to allow complete or partial shrinkage.

If desired the fibres may be under pressure and/or under tension during the bonding operation.

Other synthetic fibres as well as natural fibres which are not necessarily tacky under the process conditions may be dispersed between our fibres and thereby become incorporated in the non-woven fabric.

Such other fibres become incorporated in the webs either by adhesion to the tacky fibres, or by being maintained in position by the bonded fibres. If desired, additional bonding between the dispersed fibres as well as between the bonded fibres can be brought about by known bonding means.

The following examples illustrate but do not limit our invention.

*Example I*

A random copolymer containing 50 moles percent each of poly(ethylene terephthalate) and poly(ethylene adipate) having a second order transition temperature in the amorphous state below room temperature, is melt spun at 150° C. The melt spun filaments are tacky and tend to coalesce when brought into contact with each other at or above room temperature. The melt spun filaments are cross-wound on to a rectangular wooden block by rotating the block and moving it perpendicularly to its axis of rotation, so that layers of parallel filaments come to lie substantially at right angles to each other. The cross-wound layers of filaments adhere to each other and a fabric-like material is obtained when two or more such layers are wound on the block. The filaments lose their tackiness on standing at room temperature, whilst the fibres crystallise. The non-tacky cross-wound layers of filaments can be removed from the block and the layers cut open to form a flat piece of cloth-like material which can be folded without showing any further tendency to adhere to itself. The bonding of the filaments in the cloth is so strong that it cannot be torn or punctured by hand.

*Example II*

Synthetic filaments melt spun as in Example I which are tacky and adhere when brought into contact with each other, are collected at room temperature as they come from the spinneret on a square wooden supporting board which is being moved so that the filaments are laid down parallel to each other. When the board is covered with one layer of parallel filaments it is moved in a direction at right angles so that the next layer of parallel filaments lies perpendicular to the previous layer. The layers adhere to each other, giving a porous cloth-like material which on standing at room temperature loses its tackiness and after removal from the board can be folded without showing any further tendency to adhere to itself. The material is too strong to be torn or punctured by hand.

*Example III*

Synthetic filaments melt spun as in Example I, but at 210° C. from a single hole 0.004" spinneret, were wound up on bobbins running at uniform linear surface speeds using a rapid traverse such that the filaments were laid down in two directions at angles ranging on different bobbins from 90° to about 20° to each other. The amount of yarn laid down was varied from a thin covering on the bobbin to a covering such that the surface of the bobbin was no longer visible. The bobbins were allowed to stand at room temperature for a day, during which the yarn lost its tackiness and became partly crystalline. The resulting non-woven fabric was slipped or rolled off the bobbin and opened out to give a cylindrical fabric, or removed by slitting it lengthwise along the bobbin to give a flat rectangular fabric. These fabrics were surprisingly strong and flexible.

*Example IV*

A random co-polymer containing 70 moles percent of ethylene terephthalate units and 30 moles percent of ethylene sebacate units, having a second order transition temperature in the amorphous state below room temperature, was melt spun at 200° C. The melt spun filaments were tacky and tended to coalesce when brought into contact with each other at or above room temperature. The filaments were wound up on 6" diameter bobbins running at uniform linear surface speeds using a rapid traverse such that the filaments were laid down in two directions at angles ranging on different bobbins from 90° to about 20° to each other. The amount of yarn laid down was varied from a thin covering to a covering such that the surface of the bobbin was no longer visible. The bobbins were allowed to stand at room temperature for a day, during which the yarn lost it tackiness and became crystalline. The resulting fabric was removed from the bobbin and found to be strong and flexible. Individual filaments were strongly adhered to each other at the cross-over points.

The more nearly the angle between the filaments approached 90° the more alike the properties in directions perpendicular to each other became; the more the angle deviated from 90°, the greater the difference in properties in directions perpendicular to each other. The resistance of the fabric to deformation in a direction bisecting the angle of contact of the filaments was greater the less the angle, and lower the greater the angle.

The fabrics, although composed of crystalline fibres possessing orientation due to the spinning and wind-up processes and the shrinkage during crystallisation but lacking further imposed orientation due to a drawing process, were neither weak nor brittle. They were suitable for use as interlinings, as a bases for coatings, and for transformation into films of high tear strength.

*Example V*

A non-woven fabric was made as in Example III from a 50/50 poly(ethylene terephthalate)/poly(ethylene adipate) random co-polymer, the angle between the filaments being about 30°. The newly-formed fabric was stripped off the bobbin as soon as it ceased to be tacky, and was extended in the direction perpendicular to the direction of laying down until the angle between the filaments was approximately a right angle. The individual filaments remained adhered to each other, and the fabric was converted into a fine scrim.

*Example VI*

Undrawn 50 denier poly(ethylene terephthalate) multifilament yarn was chopped into foot lengths and laid down in lengths parallel to each other in successive layers at right angles to each other, then the structure was pressed between plates at a pressure of 5 lbs. per square foot and at a temperature of 120° C. The filaments were bonded to each other at the cross-over points and thus the structure was converted into a coherent and surprisingly strong non-woven fabric-like product. Considerable flattening of the filaments occurred during the bonding process. When the experiment was repeated with a filament laid down randomly instead of in layers the product, instead of having very different strengths and extensibilities in different directions, had similar strengths in all directions. These products from unmodified poly(ethylene terephthalate) were less flexible than those made from co-polymers containing additional aliphatic units.

I prefer to use polyesters and co-polyesters which, at least in the amorphous state, have a glass-rubber transition temperature (alternatively referred to as a second order transition temperature) below room temperature. Fibres of such polyesters can be converted into coherent fabrics directly from the spinning head without any need to maintain them at or raise them to a temperature above room temperature in order to effect bonding and crystallisation. Moreover the products from such polyesters are more flexible and drape better than the products from polyesters having a higher glass-rubber transition temperature.

It is preferred to use fibre forming polyesters derived from terephthalic acid or from copolyesters at least half of whose acid components in the copolymeric chain are terephthalic acid residues). The preferred polyester is poly(ethylene terephthalate), but polyesters derived from terephthalic acid and a glycol other than ethylene glycol, of example, 1:4 cyclohexanedimethanol may also be used. In the case of copolyesters the polyester component present in equal or minor proportion to the terephthalic acid based polyester component is preferably derived from an aliphatic dicarboxylic acid such as adipic or sebacic acids, although it may be derived from other known acids which copolymerise with polyesters derived from terephthalic acid such as isophthalic, para-hydroxybenzoic, para-2-hydroxyethoxybenzoic acids, or from aliphatic hydroxy acids such as hydroxypivalic acid, hydroxycaproic acid, hydroxydecanoic acid, hydroxybutyric acid or hydroxyvaleric acid.

As in the case of the homopolyesters, the copolyesters may be derived from a diol other than ethylene glycol, for example 1:4 cyclohexanedimethanol or poly(oxyethylene) glycol or these copolyesters may be derived from a mixture of diols.

An advantage of the present invention is that it permits the use of undrawn polyester and copolyester filaments in the manufacture of bonded non-woven fabrics which have a high tear strength and flexibility without the use of an added binder.

What I claim is:
1. A method for producing a nonwoven fabric comprising fibers of a polymer selected from the group consisting of polyester and copolyester fibers which comprises the steps of bringing said fibers into contact with each other when they are in a substantially noncrystalline state, without substantial application of pressure at a temperature above the second order transition temperature and below the crystalline melting point thereof until said fibers will adhere to each other, and thereafter crystallizing said fibers by permitting them to stand at a temperature above their second order transition temperature and below their crystalline melting point until said fibers have crystallized.

2. A method as claimed in claim 1 wherein the polyester is polyethylene terephthalate.

3. A method as claimed in claim 1 wherein a copolyester is used in which at least half of the acid component in the copolymeric chain consists of a terephthalic acid residue.

4. A method as claimed in claim 3 wherein the acid component of the copolyester which is present in addition to the terephthalic acid component, is derived from an aliphatic dicarboxylic acid.

5. A method as claimed in claim 1 wherein the fibres used for producing the non-woven fabrics are obtained from a member of the group consisting of polyester and copolyester having a second order transition temperature below room temperature.

6. Non-woven fabrics from polyester or copolyester fibres whenever made by a method claimed in claim 1.

7. A method as claimed in claim 4 wherein said aliphatic dicarboxylic acid is adipic acid.

8. A method as clamed in claim 4 wherein said aliphatic dicarboxylic acid is sebacic acid.

References Cited by the Examiner

UNITED STATES PATENTS

| | | | |
|---|---|---|---|
| 2,623,031 | 12/1952 | Snyder | 260—860 X |
| 2,836,576 | 5/1958 | Piccard et al. | 260—860 X |
| 2,865,891 | 12/1958 | Michel | 260—75 |
| 2,961,365 | 11/1960 | Sroog | 260—75 X |
| 3,090,772 | 5/1963 | Crowell | 260—75 |
| 3,110,642 | 11/1963 | Harrington et al. | 260—180 X |
| 3,148,101 | 9/1964 | Altman et al. | 156—167 |

FOREIGN PATENTS 574,562   4/1959   Canada.

EARL M. BERGERT, *Primary Examiner.*

P. R. WYLIE, W. E. HOAG, *Assistant Examiners.*